United States Patent

Albrow et al.

[11] Patent Number: 6,038,213
[45] Date of Patent: Mar. 14, 2000

[54] METHOD FOR RESTRICTING CHANNEL ACCESS DEPENDING ON SUBSCRIBER CLASSES AND SYSTEM LOADING

[75] Inventors: Richard John Albrow, Hadstock; Simon Alexander Black, Whittlesford; Leigh Carter, Haslingfield; Rupert Leslie Alexander Goodings, Cambridge; Paul Maxwell Martin, Newmarket; Neil Philip Piercy, Newton, all of United Kingdom

[73] Assignee: Ionica International Limited, United Kingdom

[21] Appl. No.: 08/809,118

[22] Filed: May 28, 1997

Related U.S. Application Data

[63] Continuation of application No. PCT/GB95/02133, Sep. 8, 1995.

[30] Foreign Application Priority Data

Sep. 16, 1994 [GB] United Kingdom .................... 9418747

[51] Int. Cl.[7] ....................................................... H04Q 7/20
[52] U.S. Cl. ............................ 370/229; 370/349; 370/461
[58] Field of Search ..................................... 370/329, 352, 370/353, 354, 447, 461, 462, 349, 229, 230, 232, 235, 236; 455/509, 512, 404; 340/825.5

[56] References Cited

U.S. PATENT DOCUMENTS

| 5,404,353 | 4/1995 | Ben-Michael et al. ................. 370/235 |
| 5,457,687 | 10/1995 | Newman ................................... 370/236 |
| 5,528,664 | 6/1996 | Slekys et al. ............................ 455/452 |
| 5,638,371 | 6/1997 | Raychaudhuri et al. ............... 370/347 |
| 5,659,881 | 8/1997 | Kent ........................................ 455/520 |
| 5,901,140 | 5/1999 | Van As et al. .......................... 370/236 |

FOREIGN PATENT DOCUMENTS

2063901 9/1992 Canada ........................... H04B 7/26

OTHER PUBLICATIONS

Copy of International Search Report.

*Primary Examiner*—Min Jung
*Attorney, Agent, or Firm*—Fish & Richardson P.C.

[57] ABSTRACT

The present invention relates to a method of transmitting digital data messages in predetermined time slots within fixed length time frames from at least one of a plurality of subscriber units to a base station for reception, in which, selectively, subscriber units which are members of one or more predetermined classes of subscriber units are restricted from transmitting at least one predetermined type of message. This advantageously helps in avoiding overload of the network. The invention also relates to corresponding communication means.

14 Claims, 2 Drawing Sheets

FIG. 3

| BIT     | 7 | 6 | 5 | 4 | 3 | 2 | 1 | 0 |
|---------|---|---|---|---|---|---|---|---|
| OCTET 0 | 1 | 1 | 1 | 0 | 0 | 0 | 0 | 0 |
| OCTET 1 | SLOT LIST SEQUENCE NUMBER ||| ACCESS CONTROL ||| LIST TYPE ||
| OCTET 2 | PHYSICAL CHANNEL NUMBER ||||||||
| OCTET 3 | PHYSICAL CHANNEL NUMBER ||||||||
| OCTET 4 | PHYSICAL CHANNEL NUMBER ||||||||

METHOD FOR RESTRICTING CHANNEL ACCESS DEPENDING ON SUBSCRIBER CLASSES AND SYSTEM LOADING

This is a National Stage of PCT Application No. PCT/GB95/02133, filed Sep. 8, 1995.

This invention relates to digital data and control message transmission in predetermined time slots within fixed length time frames.

The invention is defined in the claims, to which reference should now be made.

The present invention relates to a method of transmitting digital data messages in predetermined time slots within fixed length time frames from at least one of a plurality of subscriber units to a base station for reception, in which, selectably, subscriber units which are members of one or more predetermined class(es) of subscriber units are restricted from transmitting at least one predetermined type of message. This advantageously helps in avoiding overload of the network. The invention also relates to corresponding communication means.

It is preferred that there are at least two classes of subscriber units, each class being restricted above a different threshold of number of messages being transmitted at a time. Thus subscribers can have different priorities in accessing the network when loading is high. Preferably each class has an associated access restriction value, and the base station transmits control messages to the subscriber units, the control messages including the current access control value to control from which class or classes of subscriber units access is restricted. Preferably, the access control value restricts at least one class of subscriber unit to making emergency calls only. At all times, all subscriber units can attempt to make emergency calls.

A preferred embodiment of the invention will now be described, by way of example, and with reference to the accompanying drawings in which:

FIG. 3 is a diagram representing a slot-list message from a base station.

THE BASIC SYSTEM

Figure 1:
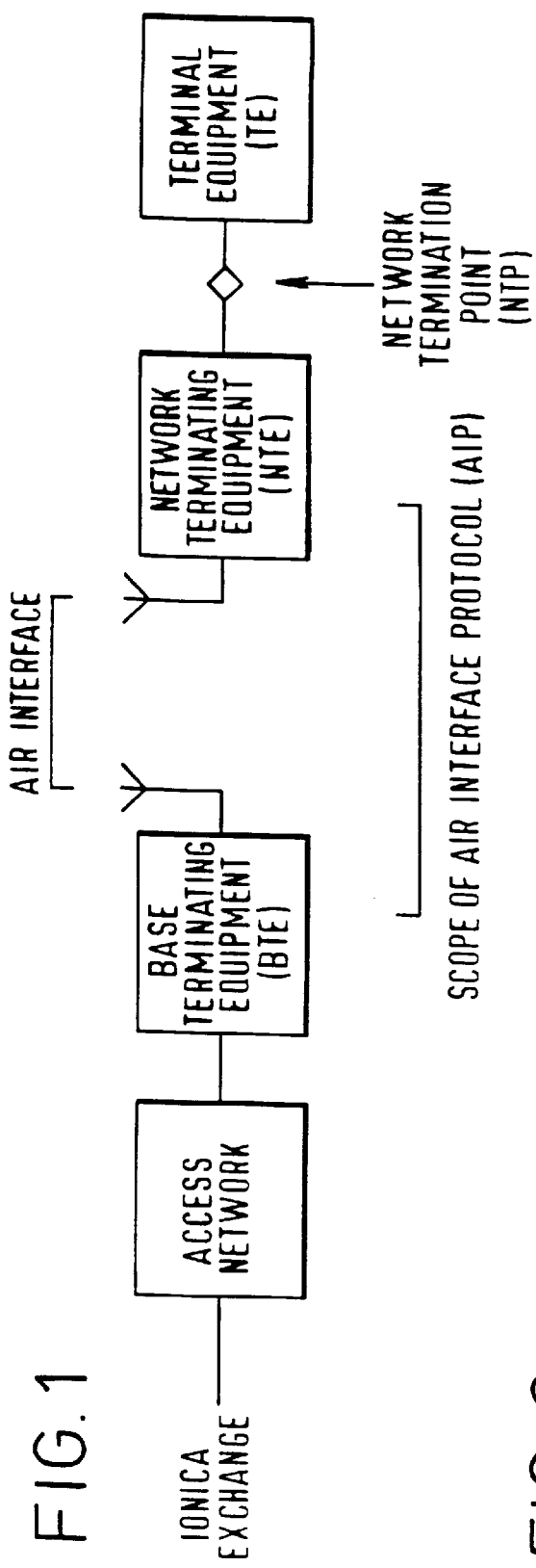
FIG. 1 is a schematic diagram illustrating the system including a base station (BTE—Base Terminating Equipment) and subscriber unit (NTE—Network Terminating Equipment)

As shown in FIG. 1, the preferred system is part of a telephone system in which the local wired loop from exchange to subscriber has been replaced by a full duplex radio link between a fixed base station and fixed subscriber. The preferred system includes the duplex radio link, and transmitters and receivers for implementing the necessary protocol. There are similarities between the preferred system and digital cellular mobile telephone systems such as GSM which are known in the art. This system uses a protocol based on a layered model, in particular one having the following layers: PHY (Physical), MAC (Medium Access Control), DLC (Data Link Control), NWK (Network). One difference compared with GSM is that, in the preferred system, subscriber units are at fixed locations and there is no need for hand-off arrangements or other features relating to mobility. This means, for example, in the preferred system, directional antennae and mains electricity can be used.

Figure 2:
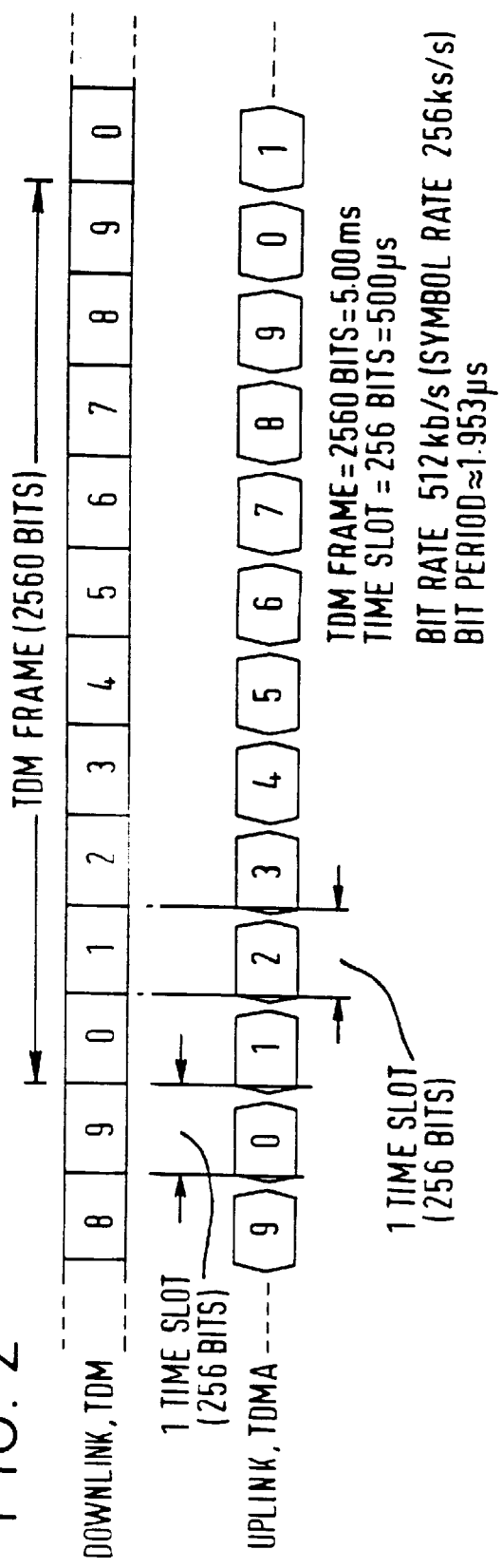
FIG. 2 is a diagram illustrating frame structure and timing for a duplex link.

Each base station in the preferred system provides six duplex radio links at twelve frequencies chosen from the overall frequency allocation, so as to minimise interference between base stations nearby. The frame structure and timing for the duplex link is illustrated in FIG. 2. Each duplex radio link comprises an up-link from a subscriber unit to a base station and, at a fixed frequency offset, a down-link from the base station to the subscriber unit. The down-links are TDM, and the up-links are TDMA. Modulation for all links is n/4—DQPSK, and the basic frame structure for all links is ten slots per frame of 2560 bits, i.e. 256 bits per slot. The bit rate is 512 kbps. Down-links are continuously transmitted and incorporate a broadcast channel for essential system information. When there is no useful information to be transmitted, the downlink transmission continues to use the basic frame and slot structure and contain a suitable fill pattern and essential broadcast channel.

For both up-link and down-link transmissions, there are two types of slot: normal slots, which are used after call set-up, and pilot slots which are used during call set-up.

Each down-link normal slot comprises 24 bits of synchronisation information followed by 24 bits designated S-field which includes an 8 bit header, followed by 160 bits designated D-field. This is followed by 24 bits of Forward Error Correction, and an 8 bit tail, followed by 12 bits of broadcast channel. The broadcast channel consists of segments in each of the slots within a frame which together form the down-link common signalling channel which is transmitted by the base station, and contains control messages containing link information such as slot lists, multi-frame and super-frame information and other information, connectionless messages and information basic to the operation of the system.

During call set-up, each down-link slot contains frequency correction data and/or a training sequence for receiver initialisation with only a short S-field and no D-field information.

Up-link slots basically contain two different types of data packet. The first type of packet, called a pilot packet, is used before a connection is set up, for example, for an ALOHA call request and to allow adaptive time alignment. The other type of data packet, called a normal packet, is used when a call has been established and is a larger data packet, due to the use of adaptive time alignment.

Each up-link normal packet contains a data packet of 244 bits which is preceded and followed by a ramp of 4 bits duration. The ramps and the remaining bits left of the 256 bit slot provide a guard gap against interference from neighbouring slots due to timing errors. Each subscriber unit adjusts the timing of its slot transmissions to compensate for the time it takes signals to reach the base station. Each up-link data packet comprises 24 bits of synchronisation data followed by an S-field and D-field of the same number of bits as in each down-link normal slot. Each up-link pilot slot contains a pilot data packet which is 192 bits long preceded and followed by 4 bit ramp defining an extended guard gap of 60 bits. This larger guard gap is necessary because there is no timing information available, and without it, propagation delays cause neighbouring slots to interfere. The pilot packet comprises 64 bits of sync followed by 104 bits of S-field which starts with an 8 bit header and finishes with a 16 bit Cyclic Redundancy Check 2 reserved bits, 14 forward error correction FEC bits, and 8 tail bits. There is no D-field.

The S-fields in the above mentioned data packets can be used for two types of signalling. The first type is MAC signalling (MS) and is used for signalling between the MAC layer of the base station and the MAC layer of a subscriber unit in which timing is important. The second type is called associated signalling, which can be slow or fast, and is used for signalling between the base station and the subscriber units in the DLC or NWK layers.

Call requests are made in random access Aloha slots as described in more detail below.

Provision is made in the preferred system for subscriber unit authorisation using a challenge response protocol. General encryption is provided by combining the speech or data with a non-predictable sequence of cipher bits produced by a key stream generator which is synchronised to the transmitted super-frame number.

In addition, the transmitted signal is scrambled to remove dc components.

CONTENTION PROTOCOL

A slotted Aloha protocol is used by subscriber units to send call set-up requests and short information messages (Datagrams) to the base station. These requests and messages are sent in a pilot packet in one of a list of slots, known as Aloha slots, that have been designated as available for this purpose in a Slot-List broadcast by the base station. A typical slot-list broadcast is illustrated in FIG. 3. A slot-list is valid for a multiframe, which consists of sixteen consecutive frames numbered 0–15, and is broadcast in one multiframe to be applicable to the following multiframe. The number of Aloha slots in a Slot-List may vary from 0 to 48, and thus the message containing this information is of variable length and may need to be segmented into several slot-list messages for transmission in the broadcast channel. Each slot-list message may designate up to three Aloha slots, as shown in the FIG. 3. A minimum number of slot-list messages are used, and these are each assigned a sequence number and are sent in ascending order, and are re-transmitted in the same order following complete transmission within the same multiframe. Typically, however, a single slot-list message will be sufficient to transmit the complete Slot-List.

The broadcast channel itself comprises a predetermined portion of each slot in every frame of the multiframe, and is used to broadcast various messages besides slot-list messages. Furthermore, different priorities are allocated to these different types of messages. Thus in frames 0 to 7 of a multiframe, slot-list messages have the lowest priority, and may not be transmitted because of the volume of other messages. However, slot-list messages are given a high priority in frames 8, 9, 12 and 13 so that transmission of at least a part, and most probably all, of the Slot-List is guaranteed.

The information in the Slot-List is encoded for reduced bandwidth, and has to be decoded by reference to a Carrier-List which includes details of bearer frequencies. This Carrier-List is also transmitted in the broadcast channel in frame 15 of the multiframe preceding that in which the Slot-List is transmitted.

The base station sends information specific to each subscriber unit of which RF carrier frequencies are:

(i) preferred (the so-called 'white' channels)
(ii) to be used if a preferred rf frequency is not available (the so-called 'grey' channels)
(iii) not to be used (the so-called 'black' channels).
Each subscriber unit stores this information.

RF frequencies are categorised as 'black', if, for example, their use by subscriber units in one sector is likely to cause interference with transmissions from subscriber units in neighbouring sectors. RF frequencies are categorised as 'grey' where they provide poor quality but acceptable propagation.

The base station controls which slots are to be included in the Slot-List taking into account the extent to which the network is currently loaded. The Aloha slots can be distributed evenly across the available radio frequency channels, although they need not be.

There may be separate Slot-Lists for call set-up requests and datagrams or a single Slot-List for both, and therefore a List-Type parameter is incorporated in each slot-list message to indicate the type of messages to be sent in the listed slots.

An Access Control Indicator is incorporated in each slot-list message and is the same for all segments of a segmented slot-list message. The Access Control Indicator is used to restrict access to emergency calls or priority users at various levels of network loading. Customers can subscribe to either of two priority services or a normal service. When the network loading is high, normal users are denied access except for emergency calls. When the network loading is virtually at capacity, all types of user are denied service except for emergency call attempts.

The Access Control Indicator may take an integer value between 1 and 4. The services are available for each of these values as follows:

| Level | Priority A User | Priority B User | Normal User |
| --- | --- | --- | --- |
| 4 | Emergency calls only | Emergency calls only | Emergency calls only |
| 3 | Any call | Emergency calls only | Emergency calls only |
| 2 | Any call | Any call | Emergency calls only |
| 1 | Any call | Any call | Any call |

Each subscriber unit maintains a Classified Carrier-List corresponding to the information received from the base station indicating radio frequency channels that are preferred ("white"), channels that are only to be used due to the poor quality they provide if no preferred channels is available ("grey"), and channels which are not to be used ("black").

RULES FOR CONTENTION BY SUBSCRIBER UNITS

A subscriber unit receives Aloha slot-list messages on the broadcast channel, starting with the first slot-list message in a multi frame, and compiles a valid Slot-List for the following multiframe which takes account of any 'black' or 'grey' channels in the Classified Carrier-List or which are not of the appropriate type (call set-up requests or Datagrams) as indicated by the List-Type. It can be considered that the Slot-List is anded with the Classified Carrier-List data of RF frequency channels to provide a valid Slot-List of slot/RF frequency/List-Type Access Control Indicator settings suitable for use. Of course, RF frequencies categorised 'white' are preferred to those categorised 'grey'.

Following reception of the final slot-list message in a sequence, the subscriber unit selects one of the Aloha slot/RF frequency settings at random from the entries of appropriate list-type in the valid Slot-List. The subscriber unit then transmits at the selected frequency and in the selected slot, a message which is either a datagram or a call set-up request. The datagram or call set-up request is sent to the base station in the selected slot at the next possible opportunity according to the setting of an extended Aloha parameter e broadcast by the base station.

If the extended Aloha parameter e is set to 1, then the message to be sent is transmitted once in the next frame. If the parameter e is set to 2, then the message is transmitted in the next frame in the set (0,2,4,6,8,10,12,14), and is repeated in the frame immediately following that in which it was first transmitted, for example, if the current frame is 5, the message shall be transmitted in frames 6 and 7. If the parameter e is set to 4, then the message is transmitted in the next frame in the set (0,4,8,12), and the message is repeated in the three consecutive frames following that in which it was first transmitted, for example, if the current frame is 5, the message shall be transmitted in frames 8,9,10,11.

If a complete Slot-List is not transmitted in a multiframe, the subscriber unit can still make use of the Aloha slot information that it has received in order to send a message in these slots.

Following transmission of a message, the subscriber unit then listens to the broadcast channel for 16-e frames and compiles a valid Slot-List for the following multiframe, and selects one of the slots x at random in case a re-transmission is required. However, if having sent a call set-up request, the subscriber unit receives an acknowledgement message from the base station in the broadcast channel, then the subscriber unit takes no further action to re-transmit the call set-up request. However, if an acknowledgement message is not received, the subscriber unit acts to re-transmit the call set-up request provided a maximum permissible number of re-transmissions has not already taken place. A re-transmission counter is incremented each time the call set-up request is transmitted so as to monitor the number of re-transmissions.

Re-transmission of a call set-up request follows the same procedure as the initial transmission in determining the slot and frame(s) used, except that there is a further rule that if the number of valid Aloha slots is less than four, then re-transmission may be delayed beyond the next frame that would otherwise be used, a random number y being generated between 1 and 4 to determine whether the first, second, third or fourth available frame is used. For example, if the extended Aloha parameter e=4, y=2 and the current frame= 3, the call set-up request shall be transmitted in frames 8,9,10,11.

ALOHA SLOT LIST MANAGEMENT

Base stations send slot list messages to subscriber units and manage slot lists dependent on the Classified Carrier-lists they have stored for each associated subscriber unit. Where certain RF frequencies are designated as not to be used ('black'), the base station manages slot list messages so as to ensure that each subscriber unit always has an RF frequency available for use.

NETWORK LOADING

At times of high loading, access to the network may need to be restricted. If the number of Aloha slots reduces sufficiently, the network will restrict access to emergency calls only. In an extreme situation, access for new call attempts may be denied completely by disabling the Slot-Lists. The network has the following means of controlling access:

reducing the number of Aloha slots available
 using the Access Control Parameter
 restricting access to datagrams or call set-up requests only
 restricting access to selected types of calls
 restricting the number of time slots per frame assigned to a call.

In periods when the network is highly loaded, for example when there are many Public Telephone Switched Network (PSTN) calls, access to the network can be restricted. PSTN calls are the normal 32 kbps speech calls to or from a subscriber, or PSTN fax/data calls which use 2 time slots per fixed length time frame, ie. requiring 64 kbps of bandwidth.

The level of usage in the network is monitored and calls are progressively restricted, as described below, as each of a series of usage thresholds is reached:

1. With increasing loading of the network, firstly test calls, which do not earn revenue, are prevented. Optionally, existing test calls can be immediately terminated.

2. At a higher threshold, system control calls requiring assignment of at least time slot per frames are prevented.

3. At a still higher threshold, assignment of a second time slot per frame to calls usually sent with more than one time slot per frame is prevented. Thus PSTN fax/data calls are sent more slowly than usual.

4. At the next highest group of thresholds, only selected call types can be made by selected groups of subscribers. In particular non-emergency PSTN calls are prevented for various types of subscriber dependent on the Access Control Parameter. Specifically subscribers can be normal users, priority B users or priority A uses as described above, each type of user having a different access priority.

Subscribers sharing a subscriber unit can have different priorities.

At the highest threshold, the last two channels are reserved for emergency calls only. Thus where there are say 60 channels (time slot/carrier frequency combinations), at a time of high loading the call set-up request for the 59th PSTN call at that time would be refused unless it is an emergency call. Of course, the number of reserved channels at the highest threshold can be other than two.

We claim:

1. A method of transmitting digital data messages comprising data packets in predetermined time slots within fixed length time frames from at least one of a plurality of subscriber units to a base station for reception, the digital data messages each being assigned to a predetermined message type in which method, subscriber units capable of transmitting each of a predetermined set of message types are selectably restricted from attempting to transmit at least one predetermined type of message.

2. A method of transmitting digital data messages according to claim 1, in which transmission is restricted dependent upon number of data packets being transmitted per unit time.

3. A method for transmitting digital data messages according to claim 1 in which there are at least two classes of subscriber units, each class being restricted from transmitting above a different threshold of number of data packets transmitted per unit time.

4. A method of transmitting digital data messages according to claim 3, in which the base station transmits control messages to the subscriber units, the control messages including a current access control value which is assigned according to which threshold is exceeded by the number of data packets being transmitted per unit time, each class having an associated access restriction value, and each class being restricted from transmitting if its access restriction value is equalled or exceeded by the current access control value.

5. A method of transmitting digital data messages according to claim 4, in which the access control value restricts at least one class of subscriber units to making emergency calls only.

6. A method of transmitting digital data messages according to claim 4, in which the control messages also include information of which RF carrier frequencies are available.

7. A method according to claim 1, in which call set-up requests are restricted from being transmitted.

8. A method according to claim 7, in which the call set-up requests which are restricted from being transmitted are those Public Switched Telephone Network (PSTN) calls which are not emergency calls.

9. A method of transmitting digital data messages according to claim 1, in which short messages (datagrams) are restricted from being transmitted.

10. A method of transmitting digital data messages according to claim 1, in which test messages are restricted from being transmitted.

11. A method of transmitting digital data messages according to claim 1 each message being transmitted is not allowed to utilize more than one time slot per frame.

12. A method of transmitting digital data messages according to claim 1, in which the subscriber units are at fixed locations.

13. A method according to claim 1, in which transmissions are by radio.

14. A communication system comprising a plurality subscriber units for transmitting digital data messages comprising data packets in predetermined time slots within fixed length time frames to a base station, the digital data messages each being assigned to a predetermined message type, in which communication system, subscriber units capable of transmitting each of a predetermined set of message types are selectably restricted from attempting to transmit at least one predetermined type of message.

* * * * *